(12) United States Patent
Bruck et al.

(10) Patent No.: US 9,592,541 B2
(45) Date of Patent: Mar. 14, 2017

(54) FLUX ASSISTED LASER REMOVAL OF THERMAL BARRIER COATING

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 95 days.

(21) Appl. No.: 14/541,590

(22) Filed: Nov. 14, 2014

(65) Prior Publication Data

US 2015/0151339 A1 Jun. 4, 2015

Related U.S. Application Data

(60) Provisional application No. 61/911,027, filed on Dec. 3, 2013.

(51) Int. Cl.
*B08B 7/00* (2006.01)
*B23K 35/36* (2006.01)
(Continued)

(52) U.S. Cl.
CPC .......... *B08B 7/0014* (2013.01); *B08B 7/0042* (2013.01); *B23K 26/144* (2015.10);
(Continued)

(58) Field of Classification Search
CPC ....... B08B 7/0014; B08B 7/0042; B08B 7/04; B23K 35/3605; B23K 35/3602;
(Continued)

(56) References Cited

U.S. PATENT DOCUMENTS 4,441,930 A * 4/1984 Baudis ................. B22D 29/002
134/2
4,750,948 A 6/1988 Consaul et al.
(Continued)

FOREIGN PATENT DOCUMENTS

EP 1013798 A2 6/2000
EP 2343149 B1 12/2010

OTHER PUBLICATIONS

Kokai et al, 1992, XeCI Laser Ablation of Yttria Stabilized Zirconia, Applied Physics, A54, p. 340-342.*
Carl Druffner, Innovative Methods for Automated Controlled Removal of Thermal Barrier Coatings, 2009, http://www.sbir.gov/sbirsearch/detail/384111.
(Continued)

*Primary Examiner* — Binh X Tran
*Assistant Examiner* — David Cathey, Jr.

(57) ABSTRACT

A method of removing a ceramic thermal barrier coating system (18). Laser energy (20) is applied to the thermal barrier coating system in the presence of a flux material (22) in order to form a melt (26). Upon removal of the energy, the melt solidifies to from a layer of slag (28) which is more loosely adhered to the underlying metallic substrate (12) than the original thermal barrier coating system. The slag is then broken and released from the substrate with a mechanical process such as grit blasting (30). Sufficient energy may be applied to melt an entire depth of the coating system along with a thin layer (34) of the substrate, thereby forming a refreshed surface (36) on the substrate upon resolidification.

18 Claims, 1 Drawing Sheet

(51) Int. Cl.
  *B23P 6/00* (2006.01)
  *B23P 6/04* (2006.01)
  *B23K 26/34* (2014.01)
  *B23K 35/02* (2006.01)
  *F01D 5/00* (2006.01)
  *B23K 26/18* (2006.01)
  *B23K 26/32* (2014.01)

(52) U.S. Cl.
  CPC ............ *B23K 26/18* (2013.01); *B23K 26/322* (2013.01); *B23K 26/34* (2013.01); *B23K 35/0244* (2013.01); *B23K 35/3602* (2013.01); *B23K 35/3605* (2013.01); *B23P 6/007* (2013.01); *B23P 6/045* (2013.01); *F01D 5/005* (2013.01); *B23K 2201/001* (2013.01); *B23K 2201/34* (2013.01)

(58) Field of Classification Search
  CPC   B23K 35/0244; B23K 26/322; B23K 24/144; B23K 26/18; B23K 26/34; B23P 6/007; B23P 6/045; F01D 25/002; F01D 5/005
  See application file for complete search history.

(56) References Cited

U.S. PATENT DOCUMENTS

| | | | |
|---|---|---|---|
| 4,940,882 A | | 7/1990 | Bates |
| 5,308,698 A | | 5/1994 | Bishel et al. |
| 5,614,054 A | * | 3/1997 | Reeves ..................... B08B 7/00 134/19 |
| 5,643,474 A | | 7/1997 | Sangeeta |
| 6,153,886 A | * | 11/2000 | Hagiwara ............. G03F 9/7088 250/548 |
| 6,664,508 B1 | | 12/2003 | Johnson et al. |
| 6,759,627 B2 | | 7/2004 | Kilburn |
| 6,833,328 B1 | * | 12/2004 | Kool ........................ C23F 1/44 134/13 |
| 2010/0224601 A1 | | 9/2010 | Sugaya et al. |
| 2013/0140279 A1 | | 6/2013 | Bruck et al. |

OTHER PUBLICATIONS

Pengcheng LV, A Novel Automated and Controlled Dual Laser Ablation System for Selective Removal of Thermal Barrier Coatings, 2010, http://www.sbir.gov/sbirsearch/detail/1571.

* cited by examiner

FLUX ASSISTED LASER REMOVAL OF THERMAL BARRIER COATING

CROSS-REFERENCE TO RELATED APPLICATIONS

This application claims the benefit of the Dec. 3, 2013, filing date of U.S. Provisional Application No. 61/911,027, the entire contents of which are incorporated herein by reference.

FIELD OF THE INVENTION

This invention relates generally to the field of materials technology, and more particularly to a method for removing a ceramic thermal barrier coating from a metallic component.

BACKGROUND OF THE INVENTION

Thermal barrier coatings (TBC) are used to provide thermal protection for metallic components exposed to the hot gas path of a gas turbine engine. A typical component may include a superalloy substrate material coated with a layer of MCrAlY bond coat material and a top coating of a ceramic material such as yttria stabilized zirconia (YSZ). During operation of the gas turbine engine, such coatings experience degradation due to wear, erosion, foreign object damage, cracking and spallation. When the coating thickness decreases below a critical dimension or its properties are otherwise degraded to a critical degree, the protection provided by the coating is no longer adequate and the underlying substrate material can be degraded by the hot combustion gas environment. Repair of such coatings typically requires the complete removal of the ceramic material and bond coat and the application of a new coating.

TBC removal is typically accomplished using some combination of autoclave, caustic and acidic solutions, and mechanical abrasion such as grit blasting. Such methods create potentially hazardous waste products, and may have detrimental effects on the underlying substrate material, such as by increasing the diameter and eroding the shape of cooling holes formed through the substrate.

Laser energy has been used for the cleaning of turbine components, for example as taught in U.S. Pat. No. 6,759,627. United States Patent Application Publication No. US 2010/0224601 A1 describes the removal of a thermal barrier coating from a turbine component by using pulsed laser energy to create mechanical shock waves within the coating which crack and remove the coating without deforming the underlying substrate. However, laser removal of TBC's has not achieved wide use in the industry.

BRIEF DESCRIPTION OF THE DRAWINGS

The invention is explained in the following description in view of the drawings that show.

DETAILED DESCRIPTION OF THE INVENTION

Figure 1:
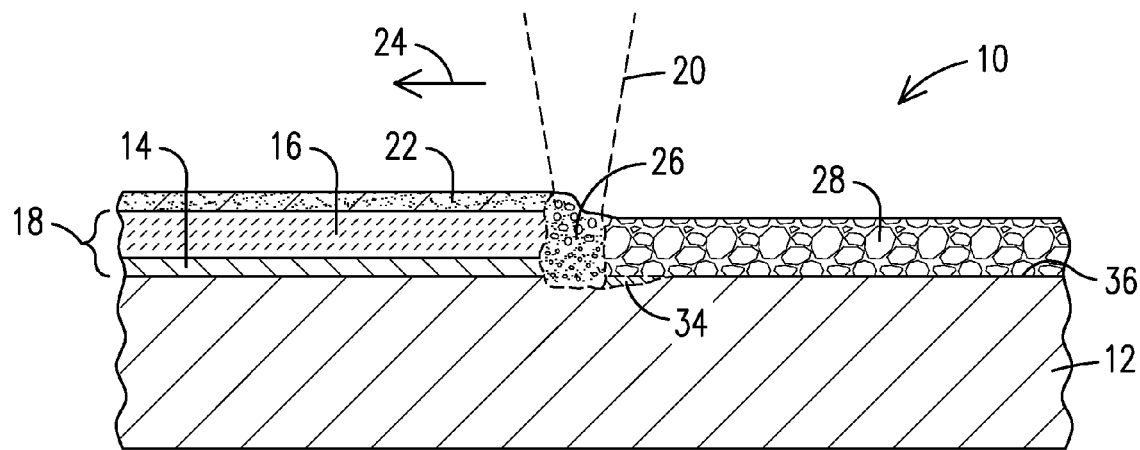
FIG. 1 is an illustration of a thermal barrier coating undergoing laser heating in the presence of a powdered flux material to form a layer of slag.

The present inventors have recognized certain limitations in the known laser removal method of removing thermal barrier coating materials which present barriers to its commercial implementation. The method of US 2010/0224601 A1 requires the laser energy pulses to be controlled to have enough energy to fracture the ceramic TBC material, but not so much energy as to permanently deform the underlying metal component surface. While an appropriate theoretical energy value may be calculated to accomplish that function, the controlled delivery of such energy is made difficult in real life applications by variables that effect the absorption of the energy by the ceramic material, such as local surface conditions of the coating, the presence of contaminants on or in the pores of the coating, non-flat surface geometries, localized smoke, local coating thickness variations, etc. Incomplete fracturing and partial retention of some TBC material can be problematic.

Accordingly, the present inventors herein describe the removal of a thermal barrier coating by using laser energy to melt the coating, rather than just cracking it, under conditions wherein re-solidification of the melted material produces a slag that only loosely adheres to the underlying metallic substrate and that can be easily removed with known mechanical methods. Such conditions are produced by melting the TBC material in the presence of a flux material, such as a powdered flux or woven fabric composed of flux that is pre-placed onto the TBC surface or that is applied (e.g. fed or sprayed) concurrently with the laser energy. The laser energy melts and allows the mixing of the ceramic thermal barrier coating material and the flux material, thereby facilitating physical and/or chemical interaction there between to produce a slag. In some embodiments, the melt includes an underlying bond coat material which is thereby incorporated into the slag and which re-solidifies in a form that makes it ineffective as a bonding material and which facilitates its removal as part of the slag. In other embodiments heating parameters may be adjusted so that the underlying bond coat is maintained and only the outer TBC material is removed. In such cases partial melting of the resulting bond coat surface can improve the mechanical characteristics of a resulting component containing the processed bond coat.

Moreover, during the TBC removal process, enough heat may be applied to melt a topmost surface layer of the underlying metallic substrate material, thereby ensuring complete removal of the TBC and bond coat layers. Advantageously, any surface cracks in the substrate material are destroyed when the surface is melted. The melted ceramic materials and flux are naturally buoyant over the melted metallic alloy material, thereby allowing the slag to form over a refreshed surface of the component substrate surface. The present inventors have previously described how the use of a flux material facilitates the re-melt repair of even the most difficult to weld superalloy materials without the occurrence of reheat cracking (see United States Patent Application Publication No. US 2013/0140279 A1, incorporated by reference herein). The present invention further advances the art by describing a process that is effective to remove a thermal barrier coating while optionally reforming the surface of the underlying superalloy substrate material with minimal risk of reheat cracking.

FIG. 1 illustrates a service run gas turbine engine component 10 formed of a superalloy material substrate 12 protected by overlying layers of bond coat material 14 and ceramic thermal barrier coating material 16. An oxide layer (not shown) may form at the interface between the bond coat material 14 and ceramic thermal barrier coating material 16. The overlying layers may be referred to collectively as a thermal barrier coating system 18. The thermal barrier coating system 18 will experience degradation during operation of the component 10 in the hot gas path environment of a gas turbine engine, and its removal may be desired in order to refurbish the component for further service in the engine. Removal of all or portions of the thermal barrier coating system 18 is accomplished by melting all or portions of its constituent layers with laser energy 20 in the presence of a flux material 22. As the laser energy 20 is traversed 24 across the component 10, a transitory melt 26 is formed which then solidifies to form a layer of slag 28.

As explained above, in other embodiments heating parameters may be adjusted (as explained below) so that the underlying bond coat 14 is maintained and only the outer TBC layer 16 is removed.

Figure 2:
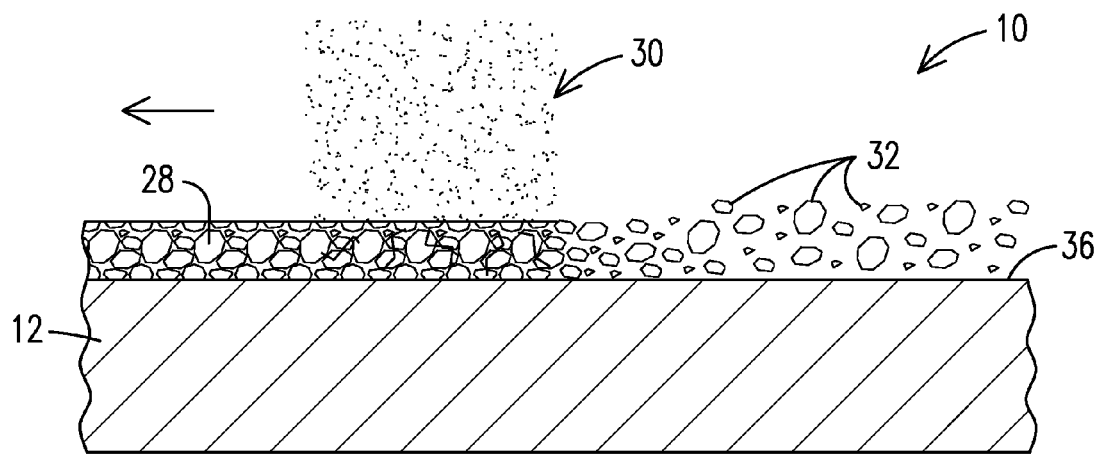
FIG. 2 illustrates the layer of slag of FIG. 1 being removed by a grit blasting process.

FIG. 2 illustrates the subsequent removal of the layer of slag 28 from the component 10 using grit blasting 30, although other techniques for removing the slag 28 are certainly contemplated such as, by non-limiting example, use of needle guns or scrapers with or without vibratory energy being applied. The grit breaks the layer of slag 28 into a plurality of loose slag particles 32 which are no longer adhered to the component 10. Certain flux materials 22 are also effective in producing a layer of slag 28 that self-detaches such that simple vacuuming removes the slag debris.

Laser energy parameters may be selected to achieve a desired size and depth of melt 26 and may utilize continuous or pulse energy of any desired footprint and transit speed at any appropriate power level, frequency and pulse duration as may be determined by one skilled in the art. In some embodiments the laser energy 20 is provided by a diode laser beam having a generally rectangular cross-sectional shape, although other known types of energy beams may be used, such as electron beam, plasma beam, one or more circular laser beams, a scanned laser beam (scanned one, two or three dimensionally), an integrated laser beam, a pulsed (versus continuous wave) laser beam, any frequency of electromagnetic energy, mechanical such as sonic energy, etc. The rectangular shape may be particularly advantageous for embodiments having a relatively large area to be melted. In some embodiments the intensity and shape of the laser energy 20 may be precisely controlled by employing programmable laser optics to form a transitory melt 26 having a precisely defined size and shape to accommodate for example repair of a small and/or intricate portion of the component 10, or for melting the thermal barrier coating layer 16 while leaving an intermediate bond coat layer 14 intact.

In the embodiment of FIG. 1, sufficient energy is applied to melt the entire depth of the thermal barrier coating system 18 as well as a thin layer 34 of the substrate material 12. The melted layer 34 of substrate material 12 solidifies to form a refreshed surface 36 of the substrate material 12 free from cracks and purged of contaminants by the action of the flux material 22 present in the melt 26. Because some embodiments may apply more than enough energy than is necessary just to melt the entire depth of the thermal barrier coating system 18, complete removal of the TBC may be ensured. Advantageously, sufficient energy can be applied to overcome any variable that affects the absorption of the energy by the ceramic material (as discussed above) because there is no adverse consequence of applying too much energy, but rather, the thickness of the layer of melted substrate material 34 is simply increased somewhat. Thus, embodiments of the present invention may be more conveniently accomplished in a real world environment than the prior art method of United States Patent Application Publication No. US 2010/0224601 A1 described above.

The flux material 22 and the layer of slag 28 provide a number of beneficial functions in the removal processes of the present disclosure.

First, the flux material 22 and the resulting slag layer 28 can both function to shield both the region of the transitory melt 26 and the solidified (but still hot) refreshed surface 36 from the atmosphere. The slag floats to the surface to separate the molten or hot metal from the atmosphere and the flux composition may be formulated to produce at least one shielding agent which generates at least one shielding gas upon exposure to laser photons or heating. In some embodiments shielding gases may coalesce into a gaseous envelope covering the melt 26. Shielding agents may include metal carbonates such as calcium carbonate ($CaCO_3$), aluminum carbonate ($Al_2(CO_3)_3$), dawsonite ($NaAl(CO_3)(OH)_2$), dolomite ($CaMg(CO_3)_2$), magnesium carbonate ($MgCO_3$), manganese carbonate ($MnCO_3$), cobalt carbonate ($CoCO_3$), nickel carbonate ($NiCO_3$), lanthanum carbonate ($La_2(CO3)_3$) and other agents known to form shielding and/or reducing gases (e.g., CO, $CO_2$, $H_2$). The presence of the slag layer 28 and the optional shielding gas can avoid or minimize the need to conduct the melt processing in the presence of inert gases (such as helium and argon) or within a sealed chamber (e.g., vacuum chamber or inert gas chamber) or using other specialized devices for excluding air. Use of gas-generating agents may also promote removal of the resulting layer of slag 28 due to increased porosity within the slag itself.

Second, the slag layer 28 can act as an insulation layer that allows the refreshed surface 36 to cool slowly and evenly, thereby reducing residual stresses that can contribute to post weld cracking, reheat or strain age cracking, and secondary reaction zone formation. Such slag blanketing can further enhance heat conduction towards the superalloy material substrate 12 which in some embodiments can promote directional solidification to form elongated (uniaxial) grains in the refreshed surface 36.

Third, the slag layer 28 can help to shape and support the transitory melt 26 to maintain a desired height/width ratio (e.g., a 1/3 height/width ratio). This shape control and support further reduces solidification stresses that could otherwise be imparted to the refreshed surface 36. Along with shape and support, the slag layer 28 can also be produced from a flux material 22 that is formulated to enhance surface smoothness of the refreshed surface 36—thereby potentially reducing the formation of secondary reaction zones and other unwanted defects in a subsequently re-coated component 10.

Fourth, the flux material 22 and the slag layer 28 can provide a cleansing effect for removing trace impurities that contribute to inferior properties. Such cleaning may include deoxidation of the transitory melt 26. Some flux compositions may also be formulated to contain at least one scavenging agent capable of removing unwanted impurities from the melt pool. Scavenging agents include metal oxides and fluorides such as calcium oxide (CaO), calcium fluoride ($CaF_2$), iron oxide (FeO), magnesium oxide (MgO), manganese oxides (MnO, $MnO_2$), niobium oxides (NbO, $NbO_2$, $Nb_2O_5$), titanium oxide ($TiO_2$), zirconium oxide ($ZrO_2$), and other agents known to react with detrimental elements such as sulfur and phosphorous and elements known to produce low melting point eutectics to form low-density byproducts expected to "float" into a resulting slag layer 28.

Fifth, the flux material 22 and the slag layer 28 can increase the proportion of thermal energy delivered to the surface of the thermal barrier coating material 16. This increase in heat absorption may occur due to the composition and/or form of the flux material 22. In terms of composition the flux may be formulated to contain at least one compound capable of absorbing laser energy at the wavelength of a laser energy beam used as the laser beam 20. Increasing the proportion of a laser absorptive compound causes a corresponding increase in the amount of laser energy (as heat) applied to the surface of the thermal barrier coating material 16. This increase in heat absorption can provide greater versatility by allowing the use of smaller and/or lower power laser sources. In some cases the laser absorptive compound could also be an exothermic compound that decomposes upon laser irradiation to release additional heat. For example, the exothermic substance could be in the form of composite exothermic particles containing a $CO_2$-generating core (e.g., including a metal carbonate) surrounded by aluminum and coated with nickel.

The form of the flux material 22 can also affect laser absorption by altering its thickness and/or particle size. In such cases absorption of laser heating generally increases as the thickness of the flux material 22 increases. Increasing the thickness of the flux layer 22 also increases the thickness of a resulting molten slag blanket, which can further enhance absorption of laser energy. The thickness of the flux layer 22 in methods of the present disclosure typically ranges from about 1 mm to about 15 mm. In some cases the thickness ranges from about 3 mm to about 12 mm, while in other instances the thickness ranges from about 5 mm to about 10 mm.

Reducing the average particle size of the flux material 22 also causes an increase in laser energy absorption (presumably through increased photon scattering within the bed of fine particles and increased photon absorption via interaction with increased total particulate surface area). In terms of the particle size, whereas commercial fluxes generally range in average particle size from about 0.5 mm to about 2 mm (500 to 2000 microns) in diameter (or approximate dimension if not rounded), the flux material 22 in some embodiments of the present disclosure may range in average particle size from about 0.005 mm to about 0.10 mm (5 to 100 microns) in diameter. In some cases the average particle size ranges from about 0.01 mm to about 5 mm, or from about 0.05 mm to about 2 mm. In other cases the average particle size ranges from about 0.1 mm to about 1 mm in diameter, or from about 0.2 mm to about 0.6 mm in diameter.

Additionally, the flux material 22 may be formulated to compensate for loss of volatilized or reacted elements during the laser processing. Such vectoring agents include titanium, zirconium, boron and aluminum containing compounds and materials such as titanium alloys (Ti), titanium oxide ($TiO_2$), titanite ($CaTiSiO_5$), aluminum alloys (Al), aluminum carbonate ($Al_2(CO_3)_3$), dawsonite ($NaAl(CO_3)(OH)_2$), borate minerals (e.g., kernite, borax, ulexite, colemanite), nickel titanium alloys (e.g., Nitinol), niobium oxides (NbO, $NbO_2$, $Nb_2O_5$) and other metal-containing compounds and materials used to supplement molten alloys with elements. Certain oxometallates as described below can also be useful as vectoring agents.

Flux materials 22 of the present disclosure may include one or more inorganic compound selected from metal oxides, metal halides, metal oxometallates and metal carbonates. Such compounds may function as (i) optically transmissive vehicles; (ii) viscosity/fluidity enhancers; (iii) shielding agents; (iv) scavenging agents; and/or (v) vectoring agents.

Suitable metal oxides include compounds such as $Li_2O$, BeO, $B_2O_3$, $B_6O$, MgO, $Na_2O$, $Al_2O_3$, $SiO_2$, CaO, $(CaO)_2$ $(SiO_2)$, $Sc_2O_3$, TiO, $TiO_2$, $Ti_2O_3$, VO, $V_2O_3$, $V_2O_4$, $V_2O_5$, $Cr_2O_3$, $CrO_3$, MnO, $MnO_2$, $Mn_2O_3$, $Mn_3O_4$, FeO, $Fe_2O_3$, $Fe_3O_4$, COO, $Co_3O_4$, NiO, $Ni_2O_3$, $Cu_2O$, CuO, ZnO, $Ga_2O_3$, $GeO_2$, $As_2O_3$, $Rb_2O$, SrO, $Y_2O_3$, $ZrO_2$, NiO, $NiO_2$, $Ni_2O_5$, $MoO_3$, $MoO_2$, $RuO_2$, $Rh_2O_3$, $RhO_2$, PdO, $Ag_2O$, CdO, $In_2O_3$, SnO, $SnO_2$, $Sb_2O_3$, $TeO_2$, $TeO_3$, $Cs_2O$, BaO, $HfO_2$, $Ta_2O_5$, $WO_2$, $WO_3$, $ReO_3$, $Re_2O_7$, $PtO_2$, $Au_2O_3$, $La_2O_3$, $CeO_2$, $Ce_2O_3$, and mixtures thereof, to name a few.

Suitable metal halides include compounds such as LiF, LiCl, LiBr, LiI, $Li_2NiBr_4$, $Li_2CuCl_4$, $LiAsF_6$, $LiPF_6$, $LiAlCl_4$, $LiGaCl_4$, $Li_2PdCl_4$, NaF, NaCl, NaBr, $NaAlF_6$, $Na_3AlF_6$, $NaSbF_6$, $NaAsF_6$, $NaAuBr_4$, $NaAlCl_4$, $Na_2PdCl_4$, $Na_2PtCl_4$, $MgF_2$, $MgCl_2$, $MgBr_2$, $AlF_3$, KCl, KF, KBr, $K_2RuCl_5$, $K_2IrCl_6$, $K_2PtCl_6$, $K_2PtCl_6$, $K_2ReCl_6$, $K_3RhCl_6$, $KSbF_6$, $KAsF_6$, $K_2NiF_6$, $K_2TiF_6$, $K_2ZrF_6$, $K_2PtI_6$, $KAuBr_4$, $K_2PdBr_4$, $K_2PdCl_4$, $CaF_2$, $CaBr_2$, $CaCl_2$, $CaI_2$, $ScBr_3$, $ScCl_3$, $ScF_3$, $ScI_3$, $TiF_3$, $VCl_2$, $VCl_3$, $CrCl_3$, $CrBr_3$, $CrCl_2$, $CrF_2$, $MnCl_2$, $MnBr_2$, $MnF_2$, $MnF_3$, $MnI_2$, $FeBr_2$, $FeBr_3$, $FeCl_2$, $FeCl_3$, $FeI_2$, $CoBr_2$, $CoCl_2$, $CoF_3$, $CoF_2$, $CoI_2$, $NiBr_2$, $NiCl_2$, $NiF_2$, $NiI_2$, CuBr, $CuBr_2$, CuCl, $CuCl_2$, $CuF_2$, CuI, $ZnF_2$, $ZnBr_2$, $ZnCl_2$, $ZnI_2$, $GaBr_3$, $Ga_2Cl_4$, $GaCl_3$, $GaF_3$, $GaI_3$, $GaBr_2$, $GeBr_2$, $GeI_2$, $GeI_4$, RbBr, RbCl, RbF, RbI, $SrBr_2$, $SrCl_2$, $SrF_2$, $SrI_2$, $YCl_3$, $YF_3$, $YI_3$, $YBr_3$, $ZrBr_4$, $ZrCl_4$, $ZrI_2$, YBr, $ZrBr_4$, $ZrCl_4$, $ZrF_4$, $ZrI_4$, $NbCl_5$, $NbF_5$, $MoCl_3$, $MoCl_5$, $RuI_3$, $RhCl_3$, $PdBr_2$, $PdCl_2$, $PdI_2$, AgCl, AgF, $AgF_2$, $AgSbF_6$, AgI, $CdBr_2$, $CdCl_2$, $CdI_2$, InBr, $InBr_3$, InCl, $InCl_2$, $InCl_3$, $InF_3$, $InI_3$, $SnBr_2$, $SnCl_2$, $SnI_2$, $SnI_4$, $SnCl_3$, $SbF_3$, $SbI_3$, CsBr, CsCl, CsF, CsI, $BaCl_2$, $BaF_2$, $BaI_2$, $BaCoF_4$, $BaNiF_4$, $HfCl_4$, $HfF_4$, $TaCl_5$, $TaF_5$, $WCl_4$, $WCl_6$, $ReCl_3$, $ReCl_5$, $IrCl_3$, $PtBr_2$, $PtCl_2$, $AuBr_3$, AuCl, $AuCl_3$, AuI, $KAuCl_4$, $LaBr_3$, $LaCl_3$, $LaF_3$, $LaI_3$, $CeBr_3$, $CeCl_3$, $CeF_3$, $CeF_4$, $CeI_3$, and mixtures thereof, to name a few.

Suitable oxometallates include compounds such as $LiIO_3$, $LiBO_2$, $Li_2SiO_3$, $LiClO_4$, $Na_2B_4O_7$, $NaBO_3$, $Na_2BiO_3$, $Na_2Bi_4O_9$, $NaVO_3$, $Na_2MoO_4$, $Na_2BeO_4$, $Na_2SeO_3$, $Na_2TeO_3$, $K_2SiO_3$, $K_2CrO_4$, $K_2Cr_2O_7$, $CaSiO_3$, $Ca_2SiO_4$, $Cr_2TiO_5$, $FeTiO_5$, $BaMnO_4$, and mixtures thereof, to name a few.

Suitable metal carbonates include compounds such as $Li_2CO_3$, $Na_2CO_3$, $NaHCO_3$, $MgCO_3$, $K_2CO_3$, $CaCO_3$, $Cr_2(CO_3)_3$, $MnCO_3$, $CoCO_3$, $NiCO_3$, $CuCO_3$, $Rb_2CO_3$, $SrCO_3$, $Y_2(CO3)_3$, $Ag_2CO_3$, $CdCO_3$, $In_2(CO_3)_3$, $Sb_2(CO_3)_3$, $C_2CO_3$, $BaCO_3La_2(CO_3)_3$, $Ce_2(CO_3)_3$, $NaAl(CO_3)(OH)_2$, and mixtures thereof, to name a few.

Optically transmissive vehicles include metal oxides, metal salts and metal silicates such as alumina ($Al_2O_3$), silica ($SiO_2$), zirconium oxide ($ZrO_2$), sodium silicate ($Na_2SiO_3$), potassium silicate ($K_2SiO_3$), and other compounds capable of optically transmitting laser energy (e.g., as generated from NdYAG, $CO_2$ and Yt fiber lasers).

Viscosity/fluidity enhancers include metal fluorides such as calcium fluoride ($CaF_2$), cryolite ($Na_3AlF_6$) and other agents known to enhance viscosity and/or fluidity (e.g., reduced viscosity with CaO, MgO, $Na_2O$, $K_2O$ and increasing viscosity with $Al_2O_3$ and $TiO_2$) in welding applications.

Shielding agents include metal carbonates such as calcium carbonate ($CaCO_3$), aluminum carbonate ($Al_2(CO_3)_3$), dawsonite ($NaAl(CO_3)(OH)_2$), dolomite ($CaMg(CO_3)_2$), magnesium carbonate ($MgCO_3$), manganese carbonate ($MnCO_3$), cobalt carbonate ($CoCO_3$), nickel carbonate ($NiCO_3$), lanthanum carbonate ($La_2(CO3)_3$) and other agents known to form shielding and/or reducing gases (e.g., CO, $CO_2$, $H_2$). Such shielding agents and other gas-generating agents known in the relevant art may also promote slag removal by increasing porosity of the slag itself.

Scavenging agents include metal oxides and fluorides such as calcium oxide (CaO), calcium fluoride ($CaF_2$), iron oxide (FeO), magnesium oxide (MgO), manganese oxides (MnO, $MnO_2$), niobium oxides (NbO, $NbO_2$, $Nb_2O_5$), titanium oxide ($TiO_2$), zirconium oxide ($ZrO_2$) and other agents known to react with detrimental elements such as sulfur and phosphorous to form low-density byproducts expected to "float" into a resulting slag layer 28.

Vectoring agents include titanium, zirconium, boron and aluminum containing compounds and materials such as titanium alloys (Ti), titanium oxide ($TiO_2$), titanite ($CaTiSiO_5$), aluminum alloys (Al), aluminum carbonate ($Al_2(CO_3)_3$), dawsonite ($NaAl(CO_3)(OH)_2$), borate minerals (e.g., kernite, borax, ulexite, colemanite), nickel titanium alloys (e.g., Nitinol), niobium oxides (NbO, $NbO_2$, $Nb_2O_5$) and other metal-containing compounds and materials used to supplement molten alloys with elements.

In some embodiments the flux material 22 may also contain certain organic fluxing agents. Examples of organic compounds exhibiting flux characteristics include high-molecular weight hydrocarbons (e.g., beeswax, paraffin), carbohydrates (e.g., cellulose), natural and synthetic oils (e.g., palm oil), organic reducing agents (e.g., charcoal, coke), carboxylic acids and dicarboxylic acids (e.g., abietic acid, isopimaric acid, neoabietic acid, dehydroabietic acid, rosins), carboxylic acid salts (e.g., rosin salts), carboxylic acid derivatives (e.g., dehydro-abietylamine), amines (e.g., triethanolamine), alcohols (e.g., high polyglycols, glycerols), natural and synthetic resins (e.g., polyol esters of fatty acids), mixtures of such compounds, and other organic compounds.

The flux material 22 may be formulated to react chemically with the constituents of the melt 26 in order to affect the mechanical properties of the resulting layer of slag 28 which can facilitate its removal. For example, it may be desirable to incorporate particularly brittle oxides into the slag 28. Moreover, when the bond coat material 14 is included in the melt 26, it will tend to mix with the melted ceramic TBC material 16 and flux 22, thereby preventing it from re-solidifying as a tightly adhered coating on the substrate material 12.

In conventional stripping methods effective dissolution of coatings occurs by chemical reactions in a hot aqueous state. By contrast, effective dissolution using non-aqueous chemical reactions with the molten flux material are enabled by the present invention to remove coatings. Dry formulations, for example, of caustic and acidic materials in the flux material 22 may be useful with the disclosed process to affect non-aqueous dissolution and removal of both thermal barrier coatings 16 and thermal barrier coating systems 18.

In addition to effective dissolution, facile slag detachability is also an important property imparted by flux materials 22 of the present disclosure for effective removal of thermal barrier coatings and systems 16, 18. Slag detachability is a function of both the physical properties of the coating materials and the flux materials, as well as chemical reactions that can occur in the transitory melt 26. For example, large differences in coefficients of thermal expansion between the layer of slag 28 and underlying substrate metal 12 can promote effective detachment of the slag. The depth of flux material 22 and the thickness of the resulting layer of slag 28 can also affect cooling rates and slag detachability as explained above. High cooling rates promote slags that are generally more difficult to remove.

Flux materials rich in zirconia ($ZrO_2$) and/or alumina ($Al_2O_3$) may provide good slag detachability in the coating removal process. In some embodiments described below, zirconia and/or alumina are contained as the majority component(s) in both the flux materials 22 and the resulting layers of slag 28. Rutile ($TiO_2$) containing fluxes can also produce slag layers 28 having good detachability. Similar benefits may also occur using titanium-containing oxometallates such as $Cr_2TiO_5$ and $FeTiO_5$. In some embodiments the flux material 22 contains an amount of rutile ($TiO_2$) ranging from about 2 percent by weight to about 10 percent by weight. In other embodiments the flux material 22 contains an amount of a titanium-containing oxometallate (e.g., $Cr_2TiO_5$, $FeTiO_5$, etc.) ranging from about 2 percent by weight to about 10 percent by weight.

For some alloy systems the presence of belite (($CaO)_2(SiO_2)$ or $Ca_2SiO_4$) in the flux material 22 can be beneficial to promote detachment of the slag layer 28; however, interactions with other compounds should also be considered. For example, the present inventors have found that the presence of $CaF_2$ in some flux materials 22 may be important in promoting fluidity of the molten slag and in reducing oxygen—but the presence of $CaF_2$ in flux materials 22 containing significant quantities of silica (or silica-type compounds) may produce a slag layer 28 that is difficult to remove. Consequently, flux compositions high in $CaF_2$ (e.g., at least 30 weight percent) and low in silica ($SiO_2$) (e.g., less than 10 weight percent) are found to be useful to dissolve coatings and to form a detachable slag layer 28. Also, flux compositions containing lower $CaF_2$ contents (e.g., less than 25 weight percent) can tolerate higher levels of silica ($SiO_2$) (e.g., more than 15 weight percent) and still be found to adequately dissolve coatings and while still forming a detachable slag layer 28. It is also recognized (as disclosed in U.S. Pat. No. 4,750,948 for submerged arc welding of nickel based alloys) that careful balancing of calcium fluoride, alumina, zirconia and cryolite ($Na_3AlF_6$) may be beneficial in producing good slag characteristics in embodiments of the present disclosure. Flux materials 22 of the present disclosure may contain modest amounts of CaO and MgO (esp., to provide cleansing action) but these compounds should be limited to avoid the formation of perovskite ($CaTiO_3$) and chromium spinel ($MgAlCrO_4$) that tend to adhere slag layers 28 to substrates 12. Flux composition of the present disclosure may include less than 20 percent by weight of CaO and MgO combined to provide some benefit without exhibiting an adverse effect on detachability. In some embodiments the flux material 22 may include less than 10 percent by weight of CaO and MgO combined.

The flux material 22 may contain a metal oxide and at least one compound selected from a metal halide, a metal silicate, an oxometallate and a metal carbonate. In some embodiments the flux material does not include $CaTiO_3$ or $MgAlCrO_4$ In some embodiments the flux material may contain at least 5 percent by weight of a metal oxide, or mixture of metal oxides, and optionally at least one of: about 1 to 70 percent by weight of at least one metal halide; about 1 to 40 percent by weight of at least one metal silicate; about 1 to 40 percent by weight of at least one oxometallate; or about 1 to 40 percent by weight of at least one metal carbonate, relative to a total weight of the flux material.

In some embodiments the flux material may contain: about 10 to 90 percent by weight of at least one metal oxide selected from the group consisting of $Al_2O_3$, $SiO_2$, $Na_2Si_4O_9$, $CaSiO_3$, $Cr_2O_3$, $K_2SiO_3$, $Ca_2SiO_4$, $(CaO)_2(SiO_2)$, $ZrO_2$, $TiO_2$, $Cr_2TiO_5$, $FeTiO_2$, CaO and MgO; 0 to about 70 percent by weight of at least one viscosity/fluidity enhancer; 0 to about 50 percent by weight of at least one metal halide (not including viscosity/fluidity enhancers as listed above for these embodiments); 0 to about 60 percent by weight of at least one metal silicate; and 0 to about 50 percent by weight of at least one metal carbonate, relative to a total weight of the flux material.

In some embodiments the flux material may contain: about 10 to 90 percent by weight of at least one metal oxide selected from the group consisting of $Al_2O_3$, $SiO_2$, $Na_2Si_4O_9$, $CaSiO_3$, $Cr_2O_3$, $K_2SiO_3$, $Ca_2SiO_4$, $(CaO)_2(SiO_2)$, $ZrO_2$, $TiO_2$, $Cr_2TiO_5$, $FeTiO_2$, CaO and MgO; 0 to about 70 percent by weight of at least one fluorine-containing compound selected from the group consisting of LiF, $LiAsF_6$, $LiPF_6$, NaF, $NaAlF_6$, $Na_3AlF_6$, $NaSbF_6$, $NaSbF_6$, $NaAsF_6$, $MgF_2$, $AlF_3$, KF, $KSbF_6$, $KAsF_6$, $K_2NiF_6$, $K_2TiF_6$, $K_2ZrF_6$, $CaF_2$, $ScF_3$, $TiF_3$, $MnF_2$, $MnF_3$, $FeF_2$, $FeF_3$, $CoF_3$, $CoF_2$, $NiF_2$, $CuF_2$, $ZnF_2$, $GaF_3$, RbF, $SrF_2$, $YF_3$, $ZrF_4$, $NbF_5$, AgF, $AgF_2$, $AsSbF_6$, $InF_3$, $SbF_3$, CsF, $BaF_2$, $BaCoF_4$, $BaNiF_4$, $HfF_4$, $TaF_5$, $LaF_3$, $CeF_3$, and $CeF_4$; 0 to about 50 percent by weight of at least one metal halide not including a fluorine-containing compound as listed above; 0 to about 60 percent by weight of at least one oxometallate; 0 to about 30 percent by weight of at least one metal carbonate; and 0 to about 10 percent by weight of at least one vectoring agent not including a metal oxide, a fluorine-containing compound, an oxometallate or a metal carbonate as listed above, relative to a total weight of the flux material.

In some embodiments the flux material may contain: about 5 to 60 percent by weight of at least one of $Al_2O_3$, $SiO_2$, $Na_2Si_4O_9$, $CaSiO_3$, $Cr_2O_3$, $K_2SiO_3$, $Na_2SiO_3$ and $K_2SiO_3$; about 10 to 50 percent by weight of at least one of $CaF_2$, $NaAlF_6$, $Na_3AlF_6$, $Na_2O$ and $K_2O$; about 1 to 30 percent by weight of at least one of $CaCO_3$, $Al_2(CO_3)_3$, $NaAl(CO_3)(OH)_2$, $CaMg(CO_3)_2$, $MgCO_3$, $MnCO_3$, $CoCO_3$, $NiCO_3$ and $La_2(CO3)_3$; about 15 to 30 percent by weight of at least one of CaO, MgO, MnO, $ZrO_2$ and $TiO_2$; and 0 to about 5 percent by weight of at least one of a Ti metal, an Al metal and $CaTiSiO_5$, relative to a total weight of the flux material.

In some embodiments the flux material may contain at least 40 percent by weight of $Al_2O_3$, $ZrO_2$, or a mixture thereof, relative to a total weight of the flux material. In some embodiments the flux material may contain at least 40 percent by weight of $Al_2O_3$, and more than 0 percent but less than 40 percent by weight of $ZrO_2$. In some embodiments the flux material may contain at least 40 percent by weight of $Al_2O_3$, and more than zero percent but less than 15 percent by weight of $ZrO_2$. In some embodiments the flux material may contain $Al_2O_3$ and $ZrO_2$, such that a weight ratio of the $Al_2O_3$ to the $ZrO_2$ ranges from about 20:1 to about 1:1, or from about 15:1 to about 3:1, or from about 10:1 to about 5:1.

In some embodiments the flux material may contain: about 5 to 80% by weight of $Al_2O_3$ and/or $ZrO_2$; about 10 to 60% by weight of $CaF_2$; about 5 to 30% by weight of $SiO_2$; about 1 to 30% by weight of at least one of $CaCO_3$, $MgCO_3$ and $MnCO_3$; about 15 to 30% by weight of at least two of CaO, MgO, MnO, $ZrO_2$ and $TiO_2$; and 0 to about 5% by weight of at least one of Ti, Al, $CaTiSiO_5$, $Al_2(CO_3)_3$ and $NaAl(CO_3)(OH)_2$, based on a total weight of the flux material.

In some embodiments the flux material may contain about 2 to 10 percent by weight of at least one selected from the group consisting of $TiO_2$, $Cr_2TiO_5$ and $FeTiO_2$, relative to a total weight of the flux material.

In some embodiments the flux material may contain: about 2 to 10 percent by weight of at least one selected from the group consisting of $TiO_2$, $Cr_2TiO_5$ and $FeTiO_2$; and greater than about 50 percent by weight of $Al_2O_3$, $ZrO_2$, or a mixture thereof, relative to a total weight of the flux material.

In some embodiments the flux material may consist of: about 2 to 10 percent by weight of at least one selected from the group consisting of $TiO_2$, $Cr_2TiO_5$ and $FeTiO_2$; equal to or greater than about 50 percent by weight of $Al_2O_3$, $ZrO_2$, or a mixture thereof; 0 to about 48 percent by weight of at least one metal oxide not including $TiO_2$, $Cr_2TiO_4$, $FeTiO_2$, $Al_2O_3$ or $ZrO_2$; 0 to about 48 percent by weight of at least one metal halide; 0 to about 48 percent by weight of at least one oxometallate not including $Cr_2TiO_5$ and $FeTiO_2$; 0 to about 48 percent by weight of at least one metal carbonate; and 0 to about 48 percent by weight of at least one organic fluxing agent, relative to a total weight of the flux material.

In some embodiments the flux material may contain about 2 to 10 percent by weight of rutile ($TiO_2$), relative to a total weight of the flux material. In other embodiments an amount of $TiO_2$ ranges from about 3 to 7 percent, relative to a total weight of the flux material.

In some embodiments the flux material may contain: about 2 to 10 percent by weight of $TiO_2$; and greater than about 50 percent by weight of $Al_2O_3$, $ZrO_2$, or a mixture thereof, relative to a total weight of the flux material.

In some embodiments the flux material may consist of: about 2 to 10 percent by weight of $TiO_2$; equal to or greater than about 50 percent by weight of $Al_2O_3$, $ZrO_2$, or a mixture thereof; 0 to about 48 percent by weight of at least one metal oxide not including $TiO_2$, $Al_2O_3$ or $ZrO_2$; 0 to about 48 percent by weight of at least one metal halide; 0 to about 48 percent by weight of at least one oxometallate; 0 to about 48 percent by weight of at least one metal carbonate; and 0 to about 48 percent by weight of at least one organic fluxing agent, relative to a total weight of the flux material.

In some embodiments the flux material may contain $(CaO)_2(SiO_2)$.

In some embodiments the flux material may contain: $(CaO)_2(SiO_2)$; and $Al_2O_3$, $ZrO_2$, or a mixture thereof.

In some embodiments the flux material may contain: about 1 to 50 percent by weight of $(CaO)_2(SiO_2)$; and equal to or greater than about 50 percent by weight of $Al_2O_3$, $ZrO_2$, or a mixture thereof, relative to a total weight of the flux material.

In some embodiments the flux material may consist of: about 1 to 50 percent by weight of $(CaO)_2(SiO_2)$; equal to or greater than about 50 percent by weight of $Al_2O_3$, $ZrO_2$, or a mixture thereof; 0 to about 49 percent by weight of at least one metal oxide not including $(CaO)_2(SiO_2)$, $Al_2O_3$ or $ZrO_2$; 0 to about 49 percent by weight of at least one metal halide; 0 to about 49 percent by weight of at least one oxometallate not including $Ca_2SiO_4$; 0 to about 49 percent by weight of at least one metal carbonate; and 0 to about 49 percent by weight of at least one organic fluxing agent, relative to a total weight of the flux material.

In some embodiments the flux material may contain: at least one fluoride-containing compound selected from the group consisting of LiF, $LiAsF_6$, $LiPF_6$, NaF, $Na_3AlF_6$, $NaSbF_6$, $NaSbF_6$, $NaAsF_6$, $MgF_2$, $AlF_3$, KF, $KSbF_6$, $KAsF_6$, $K_2NiF_6$, $K_2TiF_6$, $K_2ZrF_6$, $CaF_2$, $ScF_3$, $TiF_3$, $MnF_2$, $MnF_3$, $FeF_2$, $FeF_3$, $CoF_3$, $CoF_2$, $NiF_2$, $CuF_2$, $ZnF_2$, $GaF_3$, RbF, $SrF_2$, $YF_3$, $ZrF_4$, $NbF_5$, AgF, $AgF_2$, $AsSbF_6$, $InF_3$, $SbF_3$, CsF, $BaF_2$, $BaCoF_4$, $BaNiF_4$, $HfF_4$, $TaF_5$, $LaF_3$, $CeF_3$, and $CeF_4$; and at least one selected from the group consisting of $SiO_2$, $(CaO)_2(SiO_2)$, $Li_2SiO_3$, $Na_2SiO_3$, $K_2SiO_3$, $CaSiO_3$, $Ca_2SiO_4$.

In some embodiments the flux material may contain: equal to or greater than about 30 percent by weight of at least one fluoride-containing compound selected from the group consisting of LiF, LiAsF$_6$, LiPF$_6$, NaF, Na$_3$AlF$_6$, NaSbF$_6$, NaSbF$_6$, NaAsF$_6$, MgF$_2$, AlF$_3$, KF, KSbF$_6$, KAsF$_6$, K$_2$NiF$_6$, K$_2$TiF$_6$, K$_2$ZrF$_6$, CaF$_2$, ScF$_3$, TiF$_3$, MnF$_2$, MnF$_3$, FeF$_2$, FeF$_3$, CoF$_3$, CoF$_2$, NiF$_2$, CuF$_2$, ZnF$_2$, GaF$_3$, RbF, SrF$_2$, YF$_3$, ZrF$_4$, NbF$_5$, AgF, AgF$_2$, AsSbF$_6$, InF$_3$, SbF$_3$, CsF, BaF$_2$, BaCoF$_4$, BaNiF$_4$, HfF$_4$, TaF$_5$, LaF$_3$, CeF$_3$, and CeF$_4$; and more than 0 percent but less than about 10 percent by weight of at least one selected from the group consisting of SiO$_2$, (CaO)$_2$(SiO$_2$), Li$_2$SiO$_3$, Na$_2$SiO$_3$, K$_2$SiO$_3$, CaSiO$_3$, Ca$_2$SiO$_4$, relative to a total weight of the flux material.

In some embodiments the flux material may contain: equal to or greater than about 30 percent by weight of at least one fluoride-containing compound selected from the group consisting of LiF, LiAsF$_6$, LiPF$_6$, NaF, Na$_3$AlF$_6$, NaSbF$_6$, NaSbF$_6$, NaAsF$_6$, MgF$_2$, AlF$_3$, KF, KSbF$_6$, KAsF$_6$, K$_2$NiF$_6$, K$_2$TiF$_6$, K$_2$ZrF$_6$, CaF$_2$, ScF$_3$, TiF$_3$, MnF$_2$, MnF$_3$, FeF$_2$, FeF$_3$, CoF$_3$, CoF$_2$, NiF$_2$, CuF$_2$, ZnF$_2$, GaF$_3$, RbF, SrF$_2$, YF$_3$, ZrF$_4$, NbF$_5$, AgF, AgF$_2$, AsSbF$_6$, InF$_3$, SbF$_3$, CsF, BaF$_2$, BaCoF$_4$, BaNiF$_4$, HfF$_4$, TaF$_5$, LaF$_3$, CeF$_3$, and CeF$_4$; more than 0 percent but less than about 10 percent by weight of at least one selected from the group consisting of SiO$_2$, (CaO)$_2$(SiO$_2$), Li$_2$SiO$_3$, Na$_2$SiO$_3$, K$_2$SiO$_3$, CaSiO$_3$, Ca$_2$SiO$_4$; and more than 0 percent but less than about 70 percent by weight of Al$_2$O$_3$, ZrO$_2$, or a mixture thereof, relative to a total weight of the flux material.

In some embodiments the flux material may consist of: equal to or greater than about 30 percent by weight of at least one fluoride-containing compound selected from the group consisting of LiF, LiAsF$_6$, LiPF$_6$, NaF, Na$_3$AlF$_6$, NaSbF$_6$, NaSbF$_6$, NaAsF$_6$, MgF$_2$, AlF$_3$, KF, KSbF$_6$, KAsF$_6$, K$_2$NiF$_6$, K$_2$TiF$_6$, K$_2$ZrF$_6$, CaF$_2$, ScF$_3$, TiF$_3$, MnF$_2$, MnF$_3$, FeF$_2$, FeF$_3$, CoF$_3$, CoF$_2$, NiF$_2$, CuF$_2$, ZnF$_2$, GaF$_3$, RbF, SrF$_2$, YF$_3$, ZrF$_4$, NbF$_5$, AgF, AgF$_2$, AsSbF$_6$, InF$_3$, SbF$_3$, CsF, BaF$_2$, BaCoF$_4$, BaNiF$_4$, HfF$_4$, TaF$_5$, LaF$_3$, CeF$_3$, and CeF$_4$; between about 1 percent and about 10 percent by weight of at least one selected from the group consisting of SiO$_2$, (CaO)$_2$(SiO$_2$), Li$_2$SiO$_3$, Na$_2$SiO$_3$, K$_2$SiO$_3$, CaSiO$_3$, Ca$_2$SiO$_4$; more than 0 percent but less than about 70 percent by weight of Al$_2$O$_3$, ZrO$_2$, or a mixture thereof; 0 to about 68 percent by weight of at least one metal oxide not including SiO$_2$, (CaO)$_2$(SiO$_2$), Al$_2$O$_3$ or ZrO$_2$; 0 to about 68 percent by weight of at least one metal halide not including the fluoride-containing compounds listed above; 0 to about 68 percent by weight of at least one oxometallate not including Li$_2$SiO$_3$, Na$_2$SiO$_3$, K$_2$SiO$_3$, CaSiO$_3$, Ca$_2$SiO$_4$; 0 to about 68 percent by weight of at least one metal carbonate; and 0 to about 68 percent by weight of at least one organic fluxing agent, relative to a total weight of the flux material.

In some embodiments the flux material may contain: between about 1 percent by weight and about 25 percent by weight of at least one fluoride-containing compound selected from the group consisting of LiF, LiAsF$_6$, LiPF$_6$, NaF, Na$_3$AlF$_6$, NaSbF$_6$, NaSbF$_6$, NaAsF$_6$, MgF$_2$, AlF$_3$, KF, KSbF$_6$, KAsF$_6$, K$_2$NiF$_6$, K$_2$TiF$_6$, K$_2$ZrF$_6$, CaF$_2$, ScF$_3$, TiF$_3$, MnF$_2$, MnF$_3$, FeF$_2$, FeF$_3$, CoF$_3$, CoF$_2$, NiF$_2$, CuF$_2$, ZnF$_2$, GaF$_3$, RbF, SrF$_2$, YF$_3$, ZrF$_4$, NbF$_5$, AgF, AgF$_2$, AsSbF$_6$, InF$_3$, SbF$_3$, CsF, BaF$_2$, BaCoF$_4$, BaNiF$_4$, HfF$_4$, TaF$_5$, LaF$_3$, CeF$_3$, and CeF$_4$; and equal to or greater than about 15 percent by weight of at least one selected from the group consisting of SiO$_2$, (CaO)$_2$(SiO$_2$), Li$_2$SiO$_3$, Na$_2$SiO$_3$, K$_2$SiO$_3$, CaSiO$_3$, Ca$_2$SiO$_4$, relative to a total weight of the flux material.

In some embodiments the flux material may contain: between about 1 percent by weight and about 25 percent by weight of at least one fluoride-containing compound selected from the group consisting of LiF, LiAsF$_6$, LiPF$_6$, NaF, Na$_3$AlF$_6$, NaSbF$_6$, NaSbF$_6$, NaAsF$_6$, MgF$_2$, AlF$_3$, KF, KSbF$_6$, KAsF$_6$, K$_2$NiF$_6$, K$_2$TiF$_6$, K$_2$ZrF$_6$, CaF$_2$, ScF$_3$, TiF$_3$, MnF$_2$, MnF$_3$, FeF$_2$, FeF$_3$, CoF$_3$, CoF$_2$, NiF$_2$, CuF$_2$, ZnF$_2$, GaF$_3$, RbF, SrF$_2$, YF$_3$, ZrF$_4$, NbF$_5$, AgF, AgF$_2$, AsSbF$_6$, InF$_3$, SbF$_3$, CsF, BaF$_2$, BaCoF$_4$, BaNiF$_4$, HfF$_4$, TaF$_5$, LaF$_3$, CeF$_3$, and CeF$_4$; equal to or greater than about 15 percent by weight of at least one selected from the group consisting of SiO$_2$, (CaO)$_2$(SiO$_2$), Li$_2$SiO$_3$, Na$_2$SiO$_3$, K$_2$SiO$_3$, CaSiO$_3$, Ca$_2$SiO$_4$; and more than 0 percent but less than about 84 percent by weight of Al$_2$O$_3$, ZrO$_2$, or a mixture thereof relative to a total weight of the flux material.

In some embodiments the flux material may contain: between about 1 percent by weight and about 25 percent by weight of at least one fluoride-containing compound selected from the group consisting of LiF, LiAsF$_6$, LiPF$_6$, NaF, Na$_3$AlF$_6$, NaSbF$_6$, NaSbF$_6$, NaAsF$_6$, MgF$_2$, AlF$_3$, KF, KSbF$_6$, KAsF$_6$, K$_2$NiF$_6$, K$_2$TiF$_6$, K$_2$ZrF$_6$, CaF$_2$, ScF$_3$, TiF$_3$, MnF$_2$, MnF$_3$, FeF$_2$, FeF$_3$, CoF$_3$, CoF$_2$, NiF$_2$, CuF$_2$, ZnF$_2$, GaF$_3$, RbF, SrF$_2$, YF$_3$, ZrF$_4$, NbF$_5$, AgF, AgF$_2$, AsSbF$_6$, InF$_3$, SbF$_3$, CsF, BaF$_2$, BaCoF$_4$, BaNiF$_4$, HfF$_4$, TaF$_5$, LaF$_3$, CeF$_3$, and CeF$_4$; equal to or greater than about 15 percent by weight of at least one selected from the group consisting of SiO$_2$, (CaO)$_2$(SiO$_2$), Li$_2$SiO$_3$, Na$_2$SiO$_3$, K$_2$SiO$_3$, CaSiO$_3$, Ca$_2$SiO$_4$; and more than 0 percent but less than about 84 percent by weight of Al$_2$O$_3$, ZrO$_2$, or a mixture thereof, relative to a total weight of the flux material.

In some embodiments the flux material may consist of: between about 1 percent by weight and about 25 percent by weight of at least one fluoride-containing compound selected from the group consisting of LiF, LiAsF$_6$, LiPF$_6$, NaF, Na$_3$AlF$_6$, NaSbF$_6$, NaSbF$_6$, NaAsF$_6$, MgF$_2$, AlF$_3$, KF, KSbF$_6$, KAsF$_6$, K$_2$NiF$_6$, K$_2$TiF$_6$, K$_2$ZrF$_6$, CaF$_2$, ScF$_3$, TiF$_3$, MnF$_2$, MnF$_3$, FeF$_2$, FeF$_3$, CoF$_3$, CoF$_2$, NiF$_2$, CuF$_2$, ZnF$_2$, GaF$_3$, RbF, SrF$_2$, YF$_3$, ZrF$_4$, NbF$_5$, AgF, AgF$_2$, AsSbF$_6$, InF$_3$, SbF$_3$, CsF, BaF$_2$, BaCoF$_4$, BaNiF$_4$, HfF$_4$, TaF$_5$, LaF$_3$, CeF$_3$, and CeF$_4$; equal to or greater than about 15 percent by weight of at least one selected from the group consisting of SiO$_2$, (CaO)$_2$(SiO$_2$), Li$_2$SiO$_3$, Na$_2$SiO$_3$, K$_2$SiO$_3$, CaSiO$_3$, Ca$_2$SiO$_4$; and more than 0 percent but less than about 84 percent by weight of Al$_2$O$_3$, ZrO$_2$, or a mixture thereof; 0 to about 83 percent by weight of at least one metal oxide not including SiO$_2$, (CaO)$_2$(SiO$_2$), Al$_2$O$_3$ or ZrO$_2$; 0 to about 83 percent by weight of at least one metal halide not including a fluoride-containing compound listed above; 0 to about 83 percent by weight of at least one oxometallate not including Li$_2$SiO$_3$, Na$_2$SiO$_3$, K$_2$SiO$_3$, CaSiO$_3$, Ca$_2$SiO$_4$; 0 to about 83 percent by weight of at least one metal carbonate; and 0 to about 83 percent by weight of at least one organic fluxing agent, relative to a total weight of the flux material.

In some embodiments the flux material may contain CaF$_2$ and at least one selected from the group consisting of SiO$_2$, (CaO)$_2$(SiO$_2$), Li$_2$SiO$_3$, Na$_2$SiO$_3$, K$_2$SiO$_3$, CaSiO$_3$, Ca$_2$SiO$_4$.

In some embodiments the flux material may contain: equal to or greater than about 30 percent by weight of CaF$_2$; and more than 0 percent but less than about 10 percent by weight of at least one selected from the group consisting of SiO$_2$, (CaO)$_2$(SiO$_2$), Li$_2$SiO$_3$, Na$_2$SiO$_3$, K$_2$SiO$_3$, CaSiO$_3$, Ca$_2$SiO$_4$, relative to a total weight of the flux material.

In some embodiments the flux material may contain: equal to or greater than about 30 percent by weight of CaF$_2$; more than 0 percent but less than about 10 percent by weight of at least one selected from the group consisting of SiO$_2$, (CaO)$_2$(SiO$_2$), Li$_2$SiO$_3$, Na$_2$SiO$_3$, K$_2$SiO$_3$, CaSiO$_3$, Ca$_2$SiO$_4$; and more than 0 percent but less than about 70 percent by weight of $Al_2O_3$, $ZrO_2$, or a mixture thereof, relative to a total weight of the flux material.

In some embodiments the flux material may consist of: equal to or greater than about 30 percent by weight of $CaF_2$; more than 0 percent but less than about 10 percent by weight of at least one selected from the group consisting of $SiO_2$, $(CaO)_2(SiO_2)$, $Li_2SiO_3$, $Na_2SiO_3$, $K_2SiO_3$, $CaSiO_3$, $Ca_2SiO_4$; more than 0 percent and less than about 70 percent by weight of $Al_2O_3$, $ZrO_2$, or a mixture thereof; 0 to about 68 percent by weight of at least one metal oxide not including $SiO_2$, $(CaO)_2(SiO_2)$, $Al_2O_3$ or $ZrO_2$; 0 to about 68 percent by weight of at least one metal halide not including $CaF_2$; 0 to about 68 percent by weight of at least one oxometallate not including $Li_2SiO_3$, $Na_2SiO_3$, $K_2SiO_3$, $CaSiO_3$, $Ca_2SiO_4$; 0 to about 68 percent by weight of at least one metal carbonate; and 0 to about 68 percent by weight of at least one organic fluxing agent, relative to a total weight of the flux material.

In some embodiments the flux material may contain: more than 0 percent and less than about 25 percent by weight of $CaF_2$; and equal to or greater than about 15 percent by weight of at least one selected from the group consisting of $SiO_2$, $(CaO)_2(SiO_2)$, $Li_2SiO_3$, $Na_2SiO_3$, $K_2SiO_3$, $CaSiO_3$, and $Ca_2SiO_4$, relative to a total weight of the flux material.

In some embodiments the flux material may contain: more than 0 percent and less than about 25 percent by weight of $CaF_2$; equal to or greater than about 15 percent by weight of at least one selected from the group consisting of $SiO_2$, $(CaO)_2(SiO_2)$, $Li_2SiO_3$, $Na_2SiO_3$, $K_2SiO_3$, $CaSiO_3$, and $Ca_2SiO_4$; and more than 0 percent than less than about 84 percent by weight of $Al_2O_3$, $ZrO_2$, or a mixture thereof, relative to a total weight of the flux material.

In some embodiments the flux material may consist of: more than 0 percent and less than about 25 percent by weight of $CaF_2$; equal to or greater than about 15 percent by weight of at least one selected from the group consisting of $SiO_2$, $(CaO)_2(SiO_2)$, $Li_2SiO_3$, $Na_2SiO_3$, $K_2SiO_3$, $CaSiO_3$, and $Ca_2SiO_4$; and more than 0 percent and less than about 84 percent by weight of $Al_2O_3$, $ZrO_2$, or a mixture thereof; 0 to about 83 percent by weight of at least one metal oxide not including $SiO_2$, $(CaO)_2(SiO_2)$, $Al_2O_3$ or $ZrO_2$; 0 to about 83 percent by weight of at least one metal halide not including $CaF_2$; 0 to about 83 percent by weight of at least one oxometallate not including $Li_2SiO_3$, $Na_2SiO_3$, $K_2SiO_3$, $CaSiO_3$, $Ca_2SiO_4$; 0 to about 83 percent by weight of at least one metal carbonate; and 0 to about 83 percent by weight of at least one organic fluxing agent, relative to a total weight of the flux material.

In some embodiments the flux material may contain CaO and MgO.

In some embodiments the flux material may contain CaO and/or MgO, with the proviso that the flux material does not include a titanium-containing compound, an aluminum-containing compound or a chromium-containing compound.

In some embodiments the flux material may contain CaO and/or MgO, with the proviso that the flux material does not include $CaTiO_3$ or $MgAlCrO_4$.

In some embodiments the flux material may contain: about 1 to 20 percent by weight of CaO, MgO, or a mixture thereof; and about 1 to 99 percent by weight of $Al_2O_3$, $ZrO_2$, or a mixture thereof, relative to a total weight of the flux material. In some embodiments the flux material may contain: about 1 to 20 percent by weight of CaO, MgO, or a mixture thereof; and about 1 to 75 percent by weight of $ZrO_2$, relative to a total weight of the flux material.

In some embodiments the flux material may contain: about 1 to 10 percent by weight of CaO, MgO, or a mixture thereof; and about 1 to 99 percent by weight of $Al_2O_3$, $ZrO_2$, or a mixture thereof, relative to a total weight of the flux material. In some embodiments the flux material may contain: about 1 to 10 percent by weight of CaO, MgO, or a mixture thereof; and about 1 to 75 percent by weight of $ZrO_2$, relative to a total weight of the flux material.

In some embodiments the flux material may consist of: about 1 to 20 percent by weight of CaO, MgO, or a mixture thereof; about 1 to 99 percent by weight of $Al_2O_3$, $ZrO_2$, or a mixture thereof; 0 to about 99 percent by weight of at least one metal oxide not including CaO, MgO, $Al_2O_3$ or $ZrO_2$; 0 to about 99 percent by weight of at least one metal halide; 0 to about 99 percent by weight of at least one oxometallate not including $CaTiO_3$ or $MgAlCrO_4$; 0 to about 99 percent by weight of at least one metal carbonate; and 0 to about 99 percent by weight of at least one organic fluxing agent, relative to a total weight of the flux material.

In some embodiments the flux material may consist of: about 1 to 10 percent by weight of CaO, MgO, or a mixture thereof; about 1 to 99 percent by weight of $Al_2O_3$, $ZrO_2$, or a mixture thereof; 0 to about 99 percent by weight of at least one metal oxide not including CaO, MgO, $Al_2O_3$ or $ZrO_2$; 0 to about 99 percent by weight of at least one metal halide; 0 to about 99 percent by weight of at least one oxometallate not including $CaTiO_3$ or $MgAlCrO_4$; 0 to about 99 percent by weight of at least one metal carbonate; and 0 to about 99 percent by weight of at least one organic fluxing agent, relative to a total weight of the flux material.

In some embodiments the flux compositions of the present disclosure include zirconia ($ZrO_2$) and at least one metal silicate, metal fluoride, metal carbonate, metal oxide (other than zirconia), or mixtures thereof. In such cases the content of zirconia is often greater than about 7.5 percent by weight, and often less than about 75 percent by weight. In other cases the content of zirconia is greater than about 10 percent by weight and less than 50 percent by weight. In still other cases the content of zirconia is greater than about 3.5 percent by weight, and less than about 25 percent by weight. In still other cases the content of zirconia is between about 8 percent by weight and about 15 percent by weight.

In some embodiments the flux material may include a metal carbide and at least one metal oxide, metal silicate, metal fluoride, metal carbonate, or mixtures thereof. In such cases the content of the metal carbide is less than about 10 percent by weight. In other cases the content of the metal carbide is equal to or greater than about 0.001 percent by weight and less than about 5 percent by weight. In still other cases the content of the metal carbide is greater than about 0.01 percent by weight and less than about 2 percent by weight. In still other cases the content of the metal carbide is between about 0.1 percent and about 3 percent by weight.

In some embodiments the flux material may include at least two metal carbonates and at least one metal oxide, metal silicate, metal fluoride, or mixtures thereof. For example, in some instances the flux compositions include calcium carbonate (for phosphorous control) and at least one of magnesium carbonate and manganese carbonate (for sulfur control). In other cases the flux materials include calcium carbonate, magnesium carbonate and manganese carbonate. Some flux materials comprise a ternary mixture of calcium carbonate, magnesium carbonate and manganese carbonate such that a proportion of the ternary mixture is equal to or less than 30% by weight relative to a total weight of the flux material. A combination of such carbonates (binary or ternary) is beneficial in most effectively scavenging multiple tramp elements.

All of the percentages (%) by weight enumerated above are based upon a total weight of the flux material being 100%.

In some embodiments commercially availed fluxes may be used such as those sold under the names Lincolnweld P2007, Bohler Soudokay NiCrW-412, ESAB OK 10.16 and 10.90, Special Metals NT100, Oerlikon OP76, Bavaria WP 380, Sandvik 50SW, 59S or SAS1, and Avesta 805. Such commercial fluxes may be ground to a smaller particle size range before use, such as a particle size range describe above.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of removing a ceramic coating from a metallic component, the method comprising:
covering a surface of a ceramic coating on a metallic component with a flux material;
melting at least a portion of the ceramic coating and the flux material with laser energy to form a melt, wherein the melting of the ceramic coating occurs to a depth including a bond coating disposed between the ceramic coating and the metallic component;
removing the laser energy and allowing a slag to form from the melt; and
removing the slag.

2. The method of claim 1, wherein the slag is formed from melted ceramic coating, bond coating and the flux material.

3. The method of claim 1, wherein the melting of the ceramic coating occurs to its full local depth and melting of an underlying top layer of the underlying metallic component occurs such that the slag is formed over a reformed surface of the metallic component upon the removing of the laser energy.

4. The method of claim 1, wherein the flux material is pre-placed as a powder on the surface of the ceramic coating prior to the melting of the ceramic coating.

5. The method of claim 1, wherein the slag is removed by a grit blasting process.

6. The method of claim 1, wherein the melting occurs to a depth corresponding to a thickness of the ceramic coating, such that the slag is formed from melted ceramic coating and the flux material, and removing the slag uncovers a surface of a bond coating originally disposed between the ceramic coating and the metallic component.

7. The method of claim 1, wherein the flux material comprises:
equal to or greater than about 30 percent by weight of at least one fluoride-containing compound selected from the group consisting of LiF, $LiAsF_6$, $LiPF_6$, NaF, $NaAlF_6$, $Na_3AlF_6$, $NaSbF_6$, $NaSbF_6$, $NaAsF_6$, $MgF_2$, $AlF_3$, KF, $KSbF_6$, $KAsF_6$, $K_2NiF_6$, $K_2TiF_6$, $K_2ZrF_6$, $CaF_2$, $ScF_3$, $TiF_3$, $MnF_2$, $MnF_3$, $FeF_2$, $FeF_3$, $CoF_3$, $CoF_2$, $NiF_2$, $CuF_2$, $ZnF_2$, $GaF_3$, RbF, $SrF_2$, $YF_3$, $ZrF_4$, $NbF_5$, AgF, $AgF_2$, $AsSbF_6$, $InF_3$, $SbF_3$, CsF, $BaF_2$, $BaCoF_4$, $BaNiF_4$, $HfF_4$, $TaF_5$, $LaF_3$, $CeF_3$, and $CeF_4$;
between about 1 percent and about 10 percent by weight of at least one selected from the group consisting of $SiO_2$, $Na_2Si_4O_9$, $Cr_2O_3$, $(CaO)_2(SiO_2)$, $Li_2SiO_3$, $Na_2SiO_3$, $K_2SiO_3$, $CaSiO_3$, $Ca_2SiO_4$; and
between about 1 percent and about 69 percent by weight of $Al_2O_3$, $ZrO_2$, or a mixture thereof, relative to a total weight of the flux material.

8. The method of claim 1, wherein the flux material comprises:
between about 1 percent by weight and about 25 percent by weight of at least one fluoride-containing compound selected from the group consisting of LiF, $LiAsF_6$, $LiPF_6$, NaF, $NaAlF_6$, $Na_3AlF_6$, $NaSbF_6$, $NaSbF_6$, $NaAsF_6$, $MgF_2$, $AlF_3$, KF, $KSbF_6$, $KAsF_6$, $K_2NiF_6$, $K_2TiF_6$, $K_2ZrF_6$, $CaF_2$, $ScF_3$, $TiF_3$, $MnF_2$, $MnF_3$, $FeF_2$, $FeF_3$, $CoF_3$, $CoF_2$, $NiF_2$, $CuF_2$, $ZnF_2$, $GaF_3$, RbF, $SrF_2$, $YF_3$, $ZrF_4$, $NbF_5$, AgF, $AgF_2$, $AsSbF_6$, $InF_3$, $SbF_3$, CsF, $BaF_2$, $BaCoF_4$, $BaNiF_4$, $HfF_4$, $TaF_5$, $LaF_3$, $CeF_3$, and $CeF_4$;
equal to or greater than about 15 percent by weight of at least one selected from the group consisting of $SiO_2$, $Na_2Si_4O_9$, $Cr_2O_3$, $(CaO)_2(SiO_2)$, $Li_2SiO_3$, $Na_2SiO_3$, $K_2SiO_3$, $CaSiO_3$, $Ca_2SiO_4$; and
more than 0 percent but less than about 84 percent by weight of $Al_2O_3$, $ZrO_2$, or a mixture thereof, relative to a total weight of the flux material.

9. The method of claim 1, wherein the flux material comprises:
about 2 to 10 percent by weight of at least one selected from the group consisting of $TiO_2$, $Cr_2TiO_5$ and $FeTiO_2$;
equal to or greater than about 50 percent by weight of $Al_2O_3$, $ZrO_2$, or a mixture thereof;
0 to about 48 percent by weight of at least one metal oxide not including $TiO_2$, $Cr_2TiO_4$, $FeTiO_2$, $Al_2O_3$ or $ZrO_2$;
0 to about 48 percent by weight of at least one metal halide;
0 to about 48 percent by weight of at least one oxometallate not including $Cr_2TiO_5$ and $FeTiO_2$;
0 to about 48 percent by weight of at least one metal carbonate; and
0 to about 48 percent by weight of at least one organic fluxing agent, relative to a total weight of the flux material.

10. The method of claim 1, wherein the flux material comprises:
about 1 to 20 percent by weight of CaO, MgO, or a mixture thereof; and
about 1 to 99 percent by weight of $Al_2O_3$, $ZrO_2$, or a mixture thereof,
relative to a total weight of the flux material.

11. A method of removing a ceramic coating from a metallic component, the method comprising:
applying energy to at least a portion of a ceramic coating and a flux material simultaneously to form a melt, wherein the energy melts to a full local depth of the ceramic coating as well as an underlying layer of the metallic component;
removing the energy to allow the melt to solidify to form a slag; and
removing the slag using a mechanical process.

12. The method of claim 11, wherein the energy is applied using a laser beam.

13. The method of claim 11, wherein the slag forms over a reformed surface of the metallic component.

14. The method of claim 11, wherein the slag is removed by a grit blasting process.

15. The method of claim 11, wherein the flux material comprises:
equal to or greater than about 30 percent by weight of at least one fluoride-containing compound selected from the group consisting of LiF, $LiAsF_6$, $LiPF_6$, NaF, $NaAlF_6$, $Na_3AlF_6$, $NaSbF_6$, $NaSbF_6$, $NaAsF_6$, $MgF_2$, $AlF_3$, KF, $KSbF_6$, $KAsF_6$, $K_2NiF_6$, $K_2TiF_6$, $K_2ZrF_6$, $CaF_2$, $ScF_3$, $TiF_3$, $MnF_2$, $MnF_3$, $FeF_2$, $FeF_3$, $CoF_3$, $CoF_2$, $NiF_2$, $CuF_2$, $ZnF_2$, $GaF_3$, RbF, $SrF_2$, $YF_3$, $ZrF_4$, NbF$_5$, AgF, AgF$_2$, AsSbF$_6$, InF$_3$, SbF$_3$, CsF, BaF$_2$, BaCoF$_4$, BaNiF$_4$, HfF$_4$, TaF$_5$, LaF$_3$, CeF$_3$, and CeF$_4$;

between about 1 percent and about 10 percent by weight of at least one selected from the group consisting of SiO$_2$, Na$_2$Si$_4$O$_9$, Cr$_2$O$_3$, (CaO)$_2$(SiO$_2$), Li$_2$SiO$_3$, Na$_2$SiO$_3$, K$_2$SiO$_3$, CaSiO$_3$, Ca$_2$SiO$_4$; and between about 1 percent and about 70 percent by weight of Al$_2$O$_3$, ZrO$_2$, or a mixture thereof, relative to a total weight of the flux material.

16. The method of claim 11, wherein the flux material comprises:

between about 1 percent by weight and about 25 percent by weight of at least one fluoride-containing compound selected from the group consisting of LiF, LiAsF$_6$, LiPF$_6$, NaF, NaAlF$_6$, Na$_3$AlF$_6$, NaSbF$_6$, NaSbF$_6$, NaAsF$_6$, MgF$_2$, AlF$_3$, KF, KSbF$_6$, KAsF$_6$, K$_2$NiF$_6$, K$_2$TiF$_6$, K$_2$ZrF$_6$, CaF$_2$, ScF$_3$, TiF$_3$, MnF$_2$, MnF$_3$, FeF$_2$, FeF$_3$, CoF$_3$, CoF$_2$, NiF$_2$, CuF$_2$, ZnF$_2$, GaF$_3$, RbF, SrF$_2$, YF$_3$, ZrF$_4$, NbF$_5$, AgF, AgF$_2$, AsSbF$_6$, InF$_3$, SbF$_3$, CsF, BaF$_2$, BaCoF$_4$, BaNiF$_4$, HfF$_4$, TaF$_5$, LaF$_3$, CeF$_3$, and CeF$_4$;

equal to or greater than about 15 percent by weight of at least one selected from the group consisting of SiO$_2$, Na$_2$Si$_4$O$_9$, Cr$_2$O$_3$, (CaO)$_2$(SiO$_2$), Li$_2$SiO$_3$, Na$_2$SiO$_3$, K$_2$SiO$_3$, CaSiO$_3$, Ca$_2$SiO$_4$; and more than 0 percent but less than about 84 percent by weight of Al$_2$O$_3$, ZrO$_2$, or a mixture thereof, relative to a total weight of the flux material.

17. A method of removing a ceramic coating from a metallic component, the method comprising:

melting the ceramic coating material together with a flux material comprising at least one selected from the group consisting of (CaO)$_2$(SiO$_2$), Cr$_2$TiO$_5$, FeTiO$_5$ and Al$_2$O$_3$ to form a melt, wherein the flux material comprises:

about 1 to 50 percent by weight of (CaO)$_2$(SiO$_2$);

equal to or greater than about 50 percent by weight of Al$_2$O$_3$, ZrO$_2$, or a mixture thereof;

0 to about 49 percent by weight of at least one metal oxide not including (CaO)$_2$(SiO$_2$), Al$_2$O$_3$ or ZrO$_2$;

0 to about 49 percent by weight of at least one metal halide;

0 to about 49 percent by weight of at least one oxometallate not including Ca$_2$SiO$_4$;

0 to about 49 percent by weight of at least one metal carbonate; and 0 to about 49 percent by weight of at least one organic fluxing agent, relative to a total weight of the flux material;

allowing the melt to solidify to form a slag; and removing the slag from the underlying metallic component.

18. A method of removing a ceramic coating from a metallic component, the method comprising:

melting the ceramic coating material together with a flux material comprising calcium fluoride, alumina, zirconia and cryolite to form a melt, wherein the flux material comprises equal to or greater than about 30 percent by weight of a mixture of CaF$_2$ and Na$_3$AlF$_6$;

more than 0 percent but less than about 10 percent by weight of at least one selected from the group consisting of SiO$_2$, Na$_2$Si$_4$O$_9$, Cr$_2$O$_3$, (CaO)$_2$(SiO$_2$), Li$_2$SiO$_3$, Na$_2$SiO$_3$, K$_2$SiO$_3$, CaSiO$_3$, Ca$_2$SiO$_4$; and more than 0 percent but less than about 70 percent by weight of a mixture of Al$_2$O$_3$ and ZrO$_2$, relative to a total weight of the flux material;

allowing the melt to solidify to form a slag; and removing the slag from the underlying metallic component.

* * * * *